United States Patent Office 2,764,594
Patented Sept. 25, 1956

2,764,594

PENTACHLOROPHENOL SALT OF 3-AMINO-1,2,4-TRIAZOLE

Donald F. Thompson, Lansdale, and William W. Allen, Ambler, Pa., assignors to American Chemical Paint Company, Ambler, Pa., a corporation of Delaware No Drawing. Application August 5, 1954,
Serial No. 448,132

1 Claim. (Cl. 260—308)

This invention relates to a compound having herbicidal properties. The compound is the salt formed from the interaction between equimolecular proportions of pentachlorophenol and 3-amino-1,2,4-triazole. The salt is easily prepared by dissolving the reactants in a non-aqueous solvent and evaporating the solvent until crystals of the salt are formed. The salt may be purified by simple recrystallization.

The following is an illustrative, but non-limitative example of the method of making the salt:

Example 134 gms. of pentachlorophenol and 42 gms. of 3-amino 1,2,4-triazole were dissolved in ethanol. The admixture was heated on a steam bath to insure complete solution of the reactants. Thereafter, the ethanol was allowed to evaporate to one-third (⅓) of its original volume. After the reaction mixture was cooled to room temperature and allowed to stand, a mass of crude crystals of the salt was formed. The salt was then filtered on a Buchner funnel and dissolved in approximately 1200 ml. of an equal mixture of acetone and ethanol. To effect complete solution the mixed solvent was heated to boiling. On cooling to room temperature a mass of pure white crystals appeared having a melting point of 163.4–164.3° C. The solubility of the salt in water was found to be 0.041 gms./100 ml. at 24° C., in ethanol 15.01 gms./100 ml. at 24° C. and in isopropanol 9.30 gms./100 ml. at 24° C.

We claim:

The pentachlorophenol salt of 3-amino-1,2,4-triazole.

References Cited in the file of this patent

Birkofer: Ber. Deut. Chem., vol. 76B, pp. 769–73 (1943).

Ikado et al.: Chem. Abst., vol. 47, cols. 6891–2 (1953).